US012653212B2

(12) United States Patent
Defrize et al.

(10) Patent No.: US 12,653,212 B2
(45) Date of Patent: *Jun. 16, 2026

(54) ULTRAVIOLET TREATMENT OF TRANSFORMED COLEOPTERA LARVAE FOR VITAMIN D3 ENRICHMENT

(71) Applicant: NUTRI'EARTH, Lomme (FR)

(72) Inventors: Jérémy Defrize, Hallennes les Haubourdin (FR); Charles-Antoine Destailleur, Sailly sur la Lys (FR); Thomas Dormigny, Meurchin (FR)

(73) Assignee: NUTRI'EARTH, Lomme (FR)

( * ) Notice: Subject to any disclaimer, the term of this patent is extended or adjusted under 35 U.S.C. 154(b) by 862 days.

This patent is subject to a terminal disclaimer.

(21) Appl. No.: 17/758,532

(22) PCT Filed: Nov. 20, 2020

(86) PCT No.: PCT/FR2020/052144
§ 371 (c)(1),
(2) Date: Jul. 8, 2022

(87) PCT Pub. No.: WO2021/191510
PCT Pub. Date: Sep. 30, 2021

(65) Prior Publication Data
US 2023/0057551 A1 Feb. 23, 2023

(30) Foreign Application Priority Data
Mar. 24, 2020 (FR) ...................................... 2002876

(51) Int. Cl.
*A23K 10/20* (2016.01)
*A01M 1/20* (2006.01)
(Continued)

(52) U.S. Cl.
CPC ............. *A23L 5/30* (2016.08); *A01M 1/2094* (2013.01); *A01M 1/226* (2013.01); *A23K 10/20* (2016.05);
(Continued)

(58) Field of Classification Search
CPC ...... A23L 33/155; A23K 20/174; A23K 10/20
See application file for complete search history.

(56) References Cited

U.S. PATENT DOCUMENTS

2018/0242563 A1* 8/2018 Calis ...................... A01K 67/30
2018/0303126 A1* 10/2018 Hubert ................... A23K 10/26

FOREIGN PATENT DOCUMENTS

CN 110731506 A * 1/2020 ............. A23L 31/00
JP 663177767 A 7/1988
(Continued)

OTHER PUBLICATIONS

Eureka, "Specimen Collection Protection", 2017, https://www. eurekadrytech.com/blog/specimen-collection-protection (Year: 2017).*
(Continued)

*Primary Examiner* — Erik Kashnikow
*Assistant Examiner* — Ariel M Rodgers
(74) *Attorney, Agent, or Firm* — Tutunjian & Bitetto, P.C.

(57) ABSTRACT

The present invention relates to a process for preparing a beetle powder comprising a light treatment step in which at least one light source emits ultraviolet radiation toward transformed beetle larvae.

23 Claims, 1 Drawing Sheet

(51) Int. Cl.

| | |
|---|---|
| *A01M 1/22* | (2006.01) |
| *A23K 20/174* | (2016.01) |
| *A23K 40/10* | (2016.01) |
| *A23L 5/30* | (2016.01) |
| *A23L 33/155* | (2016.01) |
| *A23P 10/40* | (2016.01) |
| *A23K 50/40* | (2016.01) |
| *A23K 50/80* | (2016.01) |

(52) U.S. Cl.
CPC ............ *A23K 20/174* (2016.05); *A23K 40/10* (2016.05); *A23L 33/155* (2016.08); *A23P 10/40* (2016.08); *A23K 50/40* (2016.05); *A23K 50/80* (2016.05); *A23V 2002/00* (2013.01)

(56) References Cited

FOREIGN PATENT DOCUMENTS

| | | | |
|---|---|---|---|
| WO | 2019229332 | A1 | 12/2019 |
| WO | 2019229333 | A1 | 12/2019 |

OTHER PUBLICATIONS

Finke, "Complete nutrient content of three species of wild caught insects, pallid-winged grasshopper, rhinoceros beetles and white-lined sphinx moth", Brill, 2015, https://brill.com/view/journals/jiff/1/4/article-p281_281.xml (Year: 2015).*

IPIFF, "Guide on Good Hygene Practices", 2019, https://ipiff.org/wp-content/uploads/2019/12/Annex-7-IPIFF_Guide_A4_2019-final-version-v9.pdf (Year: 2019).*

XQ, "Research of Ultraviolet Radiation on Photosynthesis Vitamin D3 Synthesis about Dry Juvenile Fish Fillet", Scholarena, 2019, www.scholarena.com (Year: 2019).*

International Search Report from PCT/FR2020/052144 Jan. 13, 2021, 2 pgs.

D. G. A. B. Oonincx et al., "Evidence of vitamin D synthesis in insects exposed to UVb 1-27 light", Scientific Reports, Jul. 17, 2018, pp. 1-11, vol. 8, No. 1.

* cited by examiner

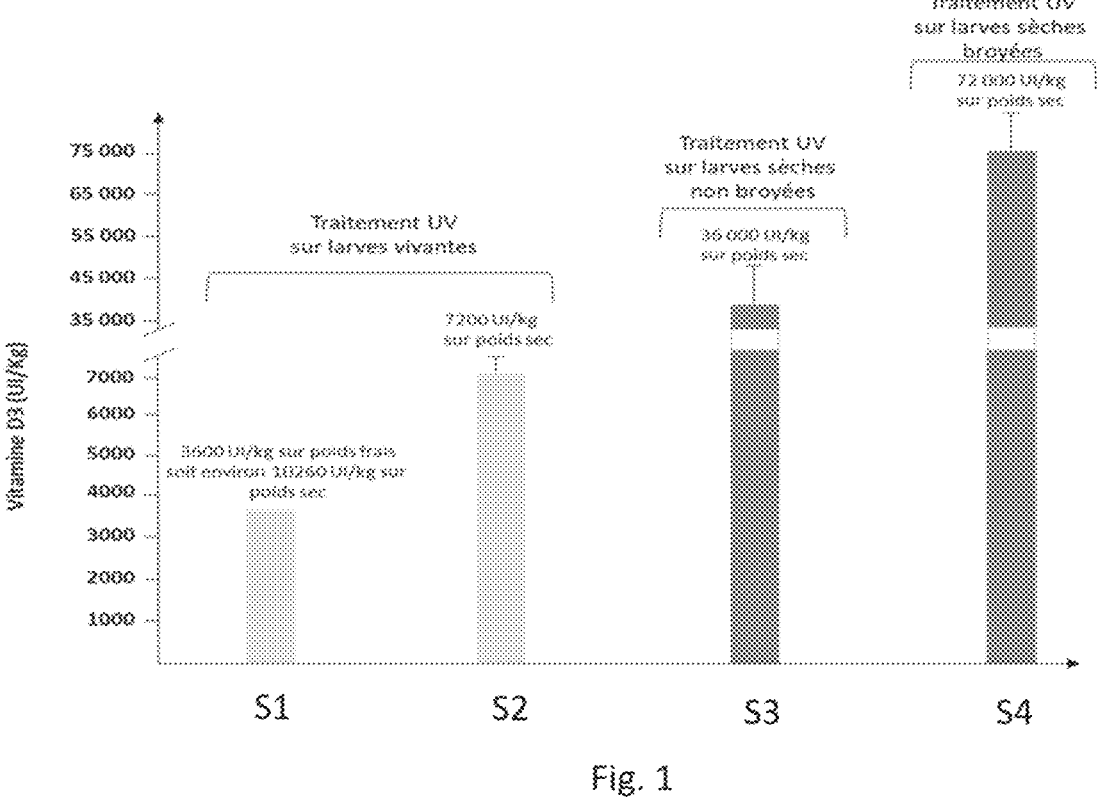
Fig. 1
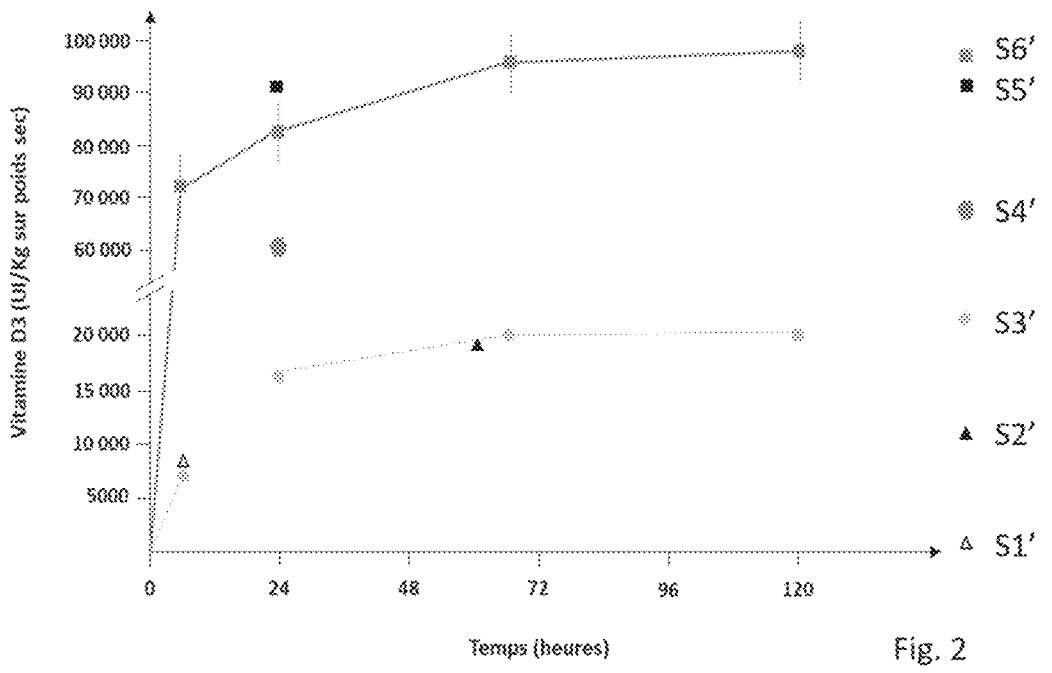
Temps (heures)                                    Fig. 2

ULTRAVIOLET TREATMENT OF TRANSFORMED COLEOPTERA LARVAE FOR VITAMIN D3 ENRICHMENT

TECHNICAL FIELD

The present invention concerns the field of the food industry.

The subject matter of the present invention more specifically concerns the preparation of a beetle-based food powder.

One of the aims of the present invention is to improve the vitamin D3 fortification of a powder obtained from beetle larvae.

The present invention thus has numerous applications in particular in the food industry, and in particular in human nutrition, reptile nutrition, animal nutrition (pet food/pet care/dietary supplement) or fish farming.

PRIOR ART

Vitamin D3 has important properties for the body.

Vitamin D3 refers here to cholecalciferol.

In humans, this vitamin D3 helps in particular to maintain normal blood levels of calcium and phosphorus absorbed by the intestine. It reinforces the immune system and improves cognitive function.

Vitamin D3 also plays an essential role in maintaining skeletal muscles and bones in humans and companion animals such as dogs.

It is, for example, used alongside calcium to prevent osteoporosis in elderly people.

In reptiles, vitamin D3 allows for optimal assimilation of calcium and bone mineralization.

It is known today that 50% of adults in good health suffer from a vitamin D3 deficiency. The daily requirements for vitamin D3 are 15 μg for adults and may be up to 20 μg in elderly people over 70 years.

Conventionally, food sources containing vitamin D3 come essentially from fish, in particular fish oils, fillets or livers. Fish, however, are a declining resource, and therefore are becoming increasingly expensive.

It is also possible to find, in the form of supplements, vitamin D3 extracted from boreal lichen or synthesized from lanolin.

Vitamin D3-rich foods are therefore available in reduced amounts; however, the demand for vitamin D3 is growing fast.

Food industry players are therefore focusing a significant amount of energy on the search for solutions that will make it possible to manufacture this vitamin D3 in a sustainable and sensible way.

Document WO2019229332 A1, belonging to the applicant, is known in the prior art.

This document proposes the manufacture of a vitamin D3-rich beetle-based food powder.

This document more specifically proposes an ultraviolet treatment, referred to as a UV treatment, during the growth phase of *Tenebrio Molitor* or Alphitobius Diaperinus larvae.

Such a UV treatment during the larval growth phase makes it possible to synthesize a large amount of vitamin D3.

Indeed, the results obtained with the fortification technology proposed in document WO2019229332 A1 demonstrate that, without a UV treatment, the larvae contain little or no vitamin D3 (between 0 and 2 μg/100 g dry weight) whereas with a UV treatment during the larval growth phase, an average maximum vitamin D3 content in the larvae of around 50 μg/100 g dry weight is obtained. These live larvae rich in vitamin D3 then make it possible, after the transformation phase, to obtain beetle powder or beetle larvae rich in vitamin D3.

The applicant asserts, however, that, at the industrial level, the implementation of the solution proposed in document WO2019229332 A1 remains complex.

Indeed, according to the technical teaching of the document above, the UV treatment is carried out directly on live larvae during their larval growth phase.

This creates numerous problems that can seriously affect the productivity of a farm and make industrialization difficult.

The applicant asserts, first, that a UV treatment on live larvae can result in a larvae mortality rate that is ten times higher than that observed in larvae in the absence of a UV treatment, in particular when the light source is placed at a distance of less than 25 centimeters from the live larvae.

Tests indeed show that the mortality rate of 12-week-old larvae having undergone a UV treatment (25 W lamp, UVB index 200) for 10 days at a distance of 25 centimeters from the light source is 0.1%, while it is 0.01% without this light treatment.

The applicant asserts, second, that the surface area necessary for carrying out this type of UV treatment is significant.

To obtain a vitamin D3 synthesis of 50 μg/100 g dry weight of larvae, it is necessary to place a 25 W UVB lamp (UVB index 200) at a distance of 25 centimeters from the tray containing the larvae for 10 days. These trays have dimensions of 56 centimeters×38 centimeters×17 centimeters. This configuration makes it possible to minimize the mortality rate by maximizing the vitamin D3 synthesis rate.

It is therefore very time-consuming in addition to taking up significant surface space since, under the conditions described above, a structure that is 125 centimeters×200 centimeters×30 centimeters makes it possible to produce only 10.5 kilograms of live larvae (that is, 3.75 kilograms of powder) every 10 days.

The applicant therefore asserts that the solutions of the prior art are not yet entirely satisfactory for industrialization in the manufacture of a vitamin D3-rich beetle-based food powder.

SUMMARY AND SUBJECT MATTER OF THE PRESENT INVENTION

The present invention is aimed at improving the situation described above.

The present invention more specifically aims to overcome the various disadvantages mentioned above by proposing an effective solution that is easy to implement at the industrial level in order to significantly increase the vitamin D3 content of a beetle powder.

The subject matter of the present invention concerns, according to a first aspect, a process for preparing a vitamin D3-fortified beetle powder, comprising a light treatment step in which at least one light source emits ultraviolet radiation toward transformed beetle larvae.

Providing the light treatment, referred to as a UV treatment, after transformation surprisingly improves the vitamin D3 content and significantly facilitates the industrialization of the process. The application of the UV treatment after transformation of the beetles makes it possible to increase, by up to tenfold, the vitamin D3 content in a beetle powder while reducing the surface area needed by two and one-half.

The term transformed larvae refers here to beetle larvae that have been subjected at least to a slaughtering process.

Advantageously, the process according to the present invention comprises, prior to the light treatment step, a step of transforming the beetle larvae comprising the slaughtering of said larvae.

Preferably, the transformation step is carried out on beetles in the larval phase.

According to a first alternative, this slaughtering is carried out by means of a cold treatment.

The term cold treatment refers, for example, to an exposure of the beetle larvae to temperatures below 4° C. for a period of more than 10 minutes.

According to a second alternative, this transformation step is carried out by a hot treatment.

The term hot treatment refers, for example, to an exposure of the beetle larvae to temperatures above 40° C. for a period of more than 15 seconds in water (scalding) or more than 30 minutes in heated air.

In a particular embodiment, it is possible, during the slaughtering step, for the larvae to be positioned in water having a temperature of between 50 and 120° C., preferably between 85° C. and 110° C., or more preferably between 90° C. and 100° C.

This is also called scalding.

Such a technique of slaughtering by scalding is effective and makes it possible to preserve the nutritional properties of the beetles and to reduce the bacterial load of the larvae.

Preferably, this scalding is carried out for a scalding time of between 30 seconds and 10 minutes, preferably between 1 and 5 minutes.

According to a third alternative, the slaughtering step may also be carried out by exposing the beetle larvae to microwaves, for example, for at least 10 seconds.

Advantageously, the transformation phase comprises, after slaughtering, a dehydration (or roasting) intended to obtain a water activity (Aw) of the powder <0.7.

For this dehydration, it is possible to use a microwave treatment.

The term microwave treatment refers to the exposure of beetle larvae to microwaves, for example, for at least 10 seconds.

For this dehydration, it is also possible, alternatively or additionally, to use a heat treatment of the slaughtered larvae.

During this heat treatment of the larvae for dehydration, the slaughtered larvae are thus placed in an environment at between 40 and 250° C., preferably between 50 and 150° C., preferably for a treatment period of between 1 hours and 24 hours, so that the slaughtered larvae have:

between 2 and 15% water, more preferably between 3 and 8% water, and/or a water activity (Aw) below 0.7.

Preferably, during the heat treatment, the transformed larvae are arranged over a thickness of between 1 and 100 millimeters, preferably between 5 and 15 millimeters.

Optionally, the transformed larvae may undergo grinding and/or pressing.

Preferably, the transformation step comprises, after slaughtering, grinding of the larvae in order to obtain a beetle powder.

It should be noted here that the grinding of larvae after dehydration makes it possible to improve vitamin D3 synthesis results after UV treatment. This step after dehydration, however, remains optional.

After dehydration and grinding, a beetle powder is obtained.

The term beetle powder refers to a dry powder (Aw<0.7) consisting, for example, of:

whole larvae of *Tenebrio Molitor* having undergone a thermal drying and grinding process;

whole larvae of Alphitobius Diaperinus having undergone a thermal drying and grinding process;

a mixture of larvae of these two species having undergone a thermal drying and grinding process;

a fraction of whole larvae of *Tenebrio Molitor* having been subjected first to a pressing process then a thermal drying and grinding process;

a fraction of whole larvae of Alphitobius Diaperinus having been subjected first to a pressing process then a thermal drying and grinding process;

a mixture of fractions of larvae of these two species having been subjected first to a pressing process then a thermal drying and grinding process.

In a particular embodiment, the transformation step comprises a first sieving of the larvae to remove residue such as excrement or possible feed remnants.

Such a sieving remains optional, however. It has a simple objective of cleaning the larvae before slaughtering.

Preferably, the transformation step comprises a fast for 24 to 48 hours. Such a fast prevents the appearance of new excrement. Such a fast therefore remains optional to implement in the present invention.

Optionally, the fasting step is followed by a second sieving.

Advantageously, the transformation step comprises, prior to slaughtering, a cold stunning at between −18° C. and +4° C.

Preferably, the cold stunning step is implemented for a stunning time of between 1 and 5 minutes.

Advantageously, the ultraviolet radiation emitted by the at least one light source toward the transformed beetle larvae during the light treatment step is:

UVB radiation and consists of electromagnetic radiation having a wavelength of between 280 nm and 320 nm; and/or UVA radiation and consists of electromagnetic radiation having a wavelength of between 320 nm and 400 nm.

Preferably, it is envisaged that, in the light treatment step, the at least one light source is positioned at a specific distance from the beetle larvae between around 1 and 100 centimeters, preferably between around 5 and 20 centimeters.

The intensity of the UV light sources decreases with increasing distances.

The amount of vitamin D3 synthesized depends upon the amount of UVB received per unit of time.

Advantageously, the at least one light source has a radiation power of between 13 and 125 Watts, preferably between 20 and 50 Watts.

Advantageously, it is envisaged that, during the light treatment step, the at least one light source emits ultraviolet radiation toward the transformed beetle larvae in treatment ranges of between 10 minutes and 24 hours continuously or cumulatively over a period of 24 hours.

Advantageously, it is envisaged that, during all or some of the light treatment step, the transformed beetle larvae are kept in an environment having a substantially constant temperature of between 20 and 30° C., preferably between 26 and 28° C.

The synthesis of vitamin D3 is optimized in the presence of a temperature above 20° C.

The subject matter of the present invention concerns, according to a second aspect, a beetle powder obtained by implementing the preparation process as described above.

Such a beetle powder obtained by the process above has a vitamin D3 concentration that is four to ten times greater than the vitamin D3 concentration obtained with the method described in document WO2019229332 A1

The subject matter of the present invention concerns, according to a third aspect, a use of a beetle powder as described above for human or animal nutrition.

Preferably, the powder is used as a food ingredient or dietary supplement.

Other advantageous uses may be envisaged, such as, for example, reptile or fish nutrition.

FIGURES

Other features and advantages of the present invention will become apparent from the description that follows, in reference to the appended FIGS. 1 and 2, which illustrate an example of an embodiment without any limiting effect, and wherein:

FIG. 1 is a graph showing the vitamin D3 concentration of a plurality of beetle larvae samples having undergone a UV light treatment having an exposure time of eight hours; and FIG. 2 is a graph showing the change in vitamin D3 concentration of a plurality of beetle larvae samples having undergone a UV light treatment, as a function of time.

DETAILED DESCRIPTION

An example of an embodiment of a vitamin D3-rich beetle powder preparation will now be described in conjunction with FIGS. 1 and 2.

As a reminder, the powder preparation to be described here is intended for the development of a technique for significantly increasing the vitamin D3 content in *Tenebrio Molitor* and/or Alphitobius Diaperinus beetle-based powders.

Unlike the techniques involving a UV treatment on live beetles, the concept underlying the present invention is to carry out such a UV treatment after transformation.

The term transformed larvae refers to beetle larvae having been subjected at least to slaughtering.

The applicant asserts that nothing in the prior art or even in the general knowledge of a person skilled in the art would make it possible to envisage that it was possible to improve the synthesis of vitamin D3 by applying a UV treatment to transformed beetles.

In the example described here and used here in the different experiments, larvae selected from the species *Tenebrio Molitor* and/or Alphitobius Diaperinus are used.

The use of other species may also be envisaged.

It should be noted here that the larval growth phase is not described in the present document because the invention relates primarily to the transformation and the UV treatment, and the phases prior to farming are not part of the present invention.

Transformation Phase:

In a particular implementation of the present invention, the transformation phase is carried out as follows.

Between the 6$^{th}$ and the 14$^{th}$ week of growth, more preferably between the 10$^{th}$ and the 13$^{th}$ week of growth, the larvae are sieved to remove excrement.

The sieved larvae are then placed in a plastic tray for fasting for 24 to 48 hours.

After the fast, the larvae are again sieved to remove the excrement.

The larvae are placed in water between 85° C. and 100° C. for slaughtering for 1 to 4 minutes. This is called hot slaughtering.

During this transformation, just before the slaughtering, there is also a step of cold stunning at between −18° C. and +4° C. for several minutes.

After slaughtering, the larvae undergo a heat treatment at a temperature of between 50 and 150° C. for a period of between 1 hour and 24 hours, according to the temperature used.

The larvae obtained contain between 2 and 15% water, more preferably between 3 and 8% water and a water activity below 0.9, more preferably below 0.7.

A grinding phase can be carried out. The term powder here encompasses any reduction to an element smaller than 3 millimeters of whole insects having undergone a heat treatment earlier in their larval or nymphal stage, or only a morphological portion of these insects.

It is understood here that this is a description of a particular embodiment of this transformation phase.

Such an implementation makes it possible to obtain good results. It should be understood here, however, that a person skilled in the art can envisage other implementations for transforming beetle larvae.

It should also be noted here that the powder manufacturers will not necessarily implement this slaughtering phase and that they may go to a supplier, a beetle farmer, who will provide already-transformed (or slaughtered) beetle larvae. In this case, the powder manufacturer will proceed directly with the fortification (or UV treatment) phase in order to fortify the powder with vitamin D3.

UV Treatment Phase:

The dehydrated and ground larvae powder or dehydrated unground whole larvae are subjected, after the end of the heat treatment, to the UV treatment as such.

In this example, the UV treatment phase is carried out in a specific room.

In the embodiment example of the present invention, it is preferable to maintain this room under ambient conditions, allowing the transformed beetles to be kept in an environment having:

a substantially constant temperature of between 20 and 30° C., preferably between 26 and 28° C.; and a substantially constant hygrometry of between 30 and 70% relative humidity, preferably between 30 and 40%.

This controlled management of the ambient parameters (temperature and hygrometry) makes it possible to obtain a better yield in the synthesis of vitamin D3.

A person skilled in the art may, however, envisage other similar ambient conditions.

In this example, the UV treatment phase lasts between 1 and 10 days and has a duration of between 10 minutes and 24 hours continuously or cumulatively over a period of 24 hours.

In the example described here, it is therefore sought to fortify transformed beetle larvae with vitamin D3 by means of a UV treatment. Such a UV treatment uses at least one ultraviolet light source (or UV source) that emits ultraviolet radiation toward transformed beetle larvae. Preferably, the UV source is kept in position over the beetle powder or whole beetles.

In this example, the ultraviolet radiation emitted by the UV source toward the beetle larvae is:

UVB radiation and consists of electromagnetic radiation having a wavelength of between 280 nm and 320 nm, and/or UVA radiation and consists of electromagnetic radiation having a wavelength of between 320 nm and 400 nm.

It should be noted here that the emission of light in the visible has no effect on the synthesis of vitamin D3.

In the example described here, the UV source is positioned, during the light treatment phase, at a specific distance from the beetle larvae between around 2 to 100 cm, preferably between 10 and 15 cm.

In this example, the UV source has a radiation power of between 13 and 125 Watts, preferably between 20 and 50 Watts.

Optionally, after this UV phase, a second heat treatment of between 40 and 200° C., preferably between 60 and 100° C. for 1 hour to 24 hours can be carried out.

Increasing the Fortification of Transformed Larvae by Up to Ten Times

First results obtained in the context of the various studies and tests conducted are especially interesting:

| Results: Document WO2019229332 A1 | Results: Invention | |
|---|---|---|
| Vitamin D3 concentration after UV treatment on live larvae for 5 days. [1] | Vitamin D3 concentration after UV treatment for 5 days on transformed larvae not reduced to powder. [1] | Vitamin D3 concentration after UV treatment for 5 days on transformed larvae reduced to powder. [1] |
| 24 µg/100 g dry weight | 97 µg/100 g dry weight | 204 µg/100 g dry weight |

[1] The live larvae and the transformed larvae are located 25 cm from the light source and placed in trays having the dimensions 57 centimeters × 38 centimeters × 17 centimeters. The thickness of the live and transformed larvae is a maximum of 1 cm. These results are confirmed and reinforced by other series of tests that will be described in detail in the description below. These additional tests and analyses (FIGS. 1 and 2) on the vitamin D3 concentration demonstrate that the present invention makes it possible to increase the vitamin D3 synthesis by up to ten times with respect to the method described in document WO2019229332 A1.

Increasing Production by 2.5 Per Unit of Surface Area

The present invention also makes it possible to increase the production of transformed larvae per unit of surface area.

As a reminder: in document WO2019229332 A1, the light sources for the UV treatment on live larvae are preferably positioned over the trays containing larvae, at an optimal distance of between 25 and 35 centimeters in order to avoid excessive mortality associated in particular with the excessive heat.

By virtue of the present invention, the light source can be placed at between 10 and 15 centimeters without any impact on mortality.

In document WO2019229332 A1, a structure having the dimensions 125 centimeters×200 centimeters×30 centimeters receiving the light sources and the trays containing live larvae over a period of 5 days makes it possible to produce 10.5 kg of live larvae, that is, 3.75 kilograms of larvae powder, containing 24 µg/100 g dry weight of vitamin D3. With the present invention, the same structure over an equivalent period makes it possible to produce 9.5 kg of larvae powder containing, as a function of the exposure time, between 50 and 500 µg/100 g dry weight of vitamin D3, that is, 2.5 times more. This is possible due to the decreased distance between the light sources and the transformed larvae, but also because it is possible to work directly on transformed larvae having undergone a heat treatment earlier. Said larvae will not lose more weight, unlike live larvae, which must undergo roasting or dehydration and which will lose 65% of their total weight by water evaporation.

Reducing the Light Treatment Time by 100

According to the technique proposed in document WO2019229332 A1, 10 days of light treatment were needed to obtain 50 µg/100 g dry weight of vitamin D3 in the larvae.

With the present invention, under optimal conditions, a concentration of 50 µg/100 g dry weight is obtained in 1 to 2 hours of UV treatment.

These results are demonstrated in the second series of tests described in detail below.

The vitamin D3 quantification analyses were carried out by a Cofrac-certified independent laboratory. The quantification is carried out by semi-preparative HPLC followed by reverse-phase HPLC with a UV/DAD detector (265 nm).

Other tests were also carried out in order to demonstrate the advantageous effects of the larvae post-transformation UV treatment.

First Series of Tests:

In this first series of tests, a plurality of samples S1, S2, S3 and S4 of *Tenebrio Molitor* larvae are provided. Each sample has differences (fresh larvae, live larvae, etc.).

These analyses were carried out by a Cofrac-certified independent laboratory according to standard EN 12821: 2009-08.

In these tests, a UV treatment is applied to each of these samples S1, S2, S3 and S4 and the vitamin D3 concentration thereof is measured.

The results and analyses of these tests on samples S1 to S4 are shown in FIG. 1; this FIG. 1 more specifically shows the vitamin D3 concentration for each of samples S1, S2, S3 and S4 after 8 hours of exposure.

The first test (sample S1) concerns a UV treatment on live *Tenebrio Molitor* larvae.

This first test involves a UV treatment on live larvae as proposed in document WO2019229332 A1. The single difference is that here, the vitamin D3 concentration is quantified directly on previously frozen fresh larvae.

In this first example, the distance of the UV lamp over the live larvae is 20 cm with the following features of the bulb: 25 W; 10% UVB, Exo Terra; mean irradiance: 74.1 µW/cm$^2$; mean temperature: 31.8° C.

According to FIG. 1, this concentration is 3600 IU/kg fresh weight, that is, around 10260 IU/kg dry weight; this conversion in concentration on dry larvae having been obtained by multiplying the concentration on fresh larvae by 2.85 (the *Tenebrio Molitor* larvae contain on average 65% water).

Here, IU refers to international unit: 1 IU=0.025 µg of vitamin D3.

The second test (sample S2) also concerns a UV treatment on live larvae.

This second test therefore involves a UV treatment on these larvae.

In this case, the distance of the lamp over the larvae sample S2 is 20 cm with the following features of the bulb: 25 W, 10% UVB, Exo Terra; mean irradiance: 75 µW/cm$^2$; mean temperature: 29.44° C.

These fresh larvae are then transformed according to the technique proposed in document WO2019229332 A1 to obtain a dry larvae powder fortified with vitamin D3 by a UV treatment during the larval phase.

Here, the vitamin D3 concentration is measured on dehydrated dry larvae.

According to FIG. 1, the vitamin D3 concentration for this sample S2 is 7200 IU/kg dry weight.

Another test (sample S3) concerns a UV treatment on transformed (dead) larvae, and more specifically unground dry larvae.

This test includes larvae that were first slaughtered, and a UV treatment as proposed according to the present invention is then applied.

This test therefore corresponds to a particular implementation of the present invention.

It should be noted that, in this example, the slaughtering is carried out by soaking in a 100° C. water bath for 2 minutes. Other techniques may, however, be envisaged by a person skilled in the art.

In this example, the transformed larvae were dehydrated at 65° C. for 14 hours.

The transformed (but not ground) larvae are then positioned under a lamp positioned at a distance of 20 cm over the dried, unground larvae; the lamp used has the following bulb features: 25 W, 10% UVB, Exo Terra; mean irradiance: 75 μW/cm$^2$; mean temperature: 30° C. According to FIG. 1, the vitamin D3 concentration for this sample S3 this time reaches 36 000 IU/kg dry weight, that is, five times more than the vitamin D3 concentration for live larvae (samples S2 and S1).

The fourth test (sample S4) concerns a UV treatment on transformed larvae, and more specifically a dried, ground larvae sample.

In this example, *Tenebrio Molitor* larvae have undergone the same slaughtering process as the larvae of sample S3.

After slaughtering, they have also been ground.

In this example, a UV treatment as proposed by the invention is therefore applied to this sample S4 after slaughtering.

In this case, the same device as that above, namely a UV lamp positioned at a distance of 20 cm over the dried, ground larvae with the following bulb features: 25 W, 10% UVB, Exo Terra. Mean irradiance: 75 μW/cm$^2$. Mean temperature: 30° C.

According to FIG. 1, the vitamin D3 concentration for this sample S4 reaches 72 000 IU/kg fresh weight this time, that is, ten times more than the vitamin D3 concentration for the live larvae (samples S1 and S2) and two times more than the vitamin D3 concentration for sample S3.

This first series of tests demonstrates the interest of the present invention by applying a UV treatment to transformed larvae (after slaughtering) (samples S3 and S4), and not live larvae as proposed in document WO2019229332 A1 (samples S1 and S2).

The applicant asserts here that, in view of a UVB exposure, one would have thought, before the present invention and the tests described above, that the transformed beetle larvae would at best have retained a vitamin D3 synthesis capacity identical to that of live larvae.

One might even have expected that this ability to synthesize vitamin D3 would be altered due to the transformation undergone by the larvae.

However, very surprisingly and unexpectedly, the results obtained show the opposite, and demonstrate that an exposure to UVB on transformed larvae results in a more powerful vitamin D3 synthesis, with vitamin D3 concentrations that are five to six times greater than the concentrations obtained after a UVB exposure on live larvae, using similar exposure times and conditions.

These results, which were unexpected, have a major impact on the yields possible per unit of surface area and therefore on the relevance of industrializing this process on transformed larvae. This series of tests also demonstrates the interest of grinding the transformed larvae before the UV treatment, which multiplies again by two the vitamin D3 concentration.

2$^{nd}$ Series of Tests:

A second series of tests was conducted in order to demonstrate the change in vitamin D3 concentration as a function of UV-B exposure time.

In these tests, a plurality of *Tenebrio Molitor* larvae samples, referred to here as S1', S2', S3', S4', S5' and S6' are provided. These samples will undergo different tests.

The results and analyses of these different tests on the samples are shown in FIG. 2. The analyses were carried out by a Cofrac-certified independent laboratory according to standard EN 12821: 2009-08.

In this second series of tests, a sample S1' corresponding to defatted beetle powder is provided. In this case, a defatted *Tenebrio Molitor* powder is provided, to which a UV treatment is applied by means of a UV lamp positioned at a distance of 20 cm over the larvae S1'. The UV lamp has the following bulb features: 25 W, 10% UVB, Exo Terra; mean irradiance: 75 μW/cm$^2$; mean temperature: 30° C.

In this example, an extraction of the oily fraction of the larvae is carried out by pressing the dried larvae having first undergone blanching for 2 minutes at 100° C. then dehydration for 12 hours at 65° C.

According to FIG. 2, after exposure to UV radiation for 10 hours, the vitamin D3 concentration of sample S1' is between 5000 and 10 000 IU/kg vitamin D3.

In this second series of tests, sample S2' here includes live larvae. Then, a UV treatment is applied to the live larvae during their growth, with a lamp having a bulb with the following features: 25 W, 10% UVB, Exo Terra; mean irradiance: 74.1 μW/cm$^2$; mean temperature: 31.8° C. As for sample S1 of FIG. 1, the analysis of the vitamin D3 concentration is carried out on frozen larvae.

According to FIG. 2, the vitamin D3 concentration of sample S2' is between 15 000 and 20 000 IU/kg of vitamin D3 after an exposure of 60 hours.

Sample S3' corresponds to groups of live larvae, to which a UV treatment is applied during the growth phase. The exposure conditions are identical to those of S1' and S2'. With an equal exposure time, according to FIG. 2, substantially identical results are obtained to those obtained for sample S2'. As for sample S2 of FIG. 1, the analysis of the vitamin D3 concentration is carried out on dehydrated, powdered larvae.

The tests carried out on samples S1', S2' and S3' correspond to examples of implementation of document WO2019229332 A1, that is, a UV treatment on live larvae.

Sample S4' corresponds to whole dried larvae (slaughtered). Before UV treatment, these larvae were transformed by slaughtering (scalding for 2 minutes at 100° C.) then dehydrated.

These larvae, however, remain unground.

Then, in this test, a UV treatment is applied to this sample S4' by a lamp having a bulb with the following features: 25 W, 10% UVB, Exo Terra; mean irradiance: 75 μW/cm$^2$; mean temperature: 29.44° C.

In spite of the fact that the slaughtered larvae are not ground, it should be noted according to FIG. 2 that the vitamin D3 concentration is high and exceeds 60 000 IU/kg of vitamin D3 after a UV-B exposure for 24 hours.

Finally, in this second series of tests, samples S5' and S6' including dried, ground larvae are provided.

Sample S5' corresponds to larvae that have been slaughtered by cold at −18° C. before being blanched for 2 min at 100° C., then dehydrated at 65° C. for 14 hours, and finally ground.

Sample S6' corresponds to larvae that have been slaughtered by scalding at 100° C. for 2 minutes, then dehydrated at 65° C. for 14 hours and finally ground. Each sampling point S6' includes 2 distinct analyses (N=2; Mean±standard deviation).

For these samples S5' and S6', a UV lamp is arranged at a distance of 20 cm over the live larvae. As for S4', this UV lamp has the following bulb features: 25 W, 10% UVB, Exo Terra; mean irradiance: 75 µW/cm²; mean temperature: 29.44° C.

According to FIG. 2, the concentration of sample S5' is between 90 000 and 100 000 IU/kg of vitamin D3 after a 24-hour exposure.

Again, according to FIG. 2, the concentration of samples S6' is between 80 000 and 90 000 IU/kg of vitamin D3 after a 24-hour exposure. This concentration then exceeds 90 000 IU/kg of vitamin D3 after a 72-hour exposure.

This second series of tests on the vitamin D3 concentration show that the present invention makes it possible to increase the vitamin D3 synthesis, over a given exposure time, by four to ten times with respect to the method described in document WO2019229332 A1.

This second series of tests also shows that grinding makes it possible to maximize the vitamin D3 synthesis, but that, nevertheless, without grinding, the results obtained remain highly favorable.

It should be noted that this detailed description concerns a particular example of an embodiment of the present invention, but that in no case does this description limit the subject matter of the invention; on the contrary, it aims to remove any possible inaccuracy or misinterpretation of the claims that follow.

It should also be noted that the reference signs placed between parentheses in the claims that follow are in no way limiting; these signs have the single purpose of improving the intelligibility and comprehension of the claims that follow, as well as the scope of protection sought.

The invention claimed is:

1. A process for preparing a vitamin D3-fortified beetle powder comprising:

transforming beetle larvae by slaughtering, dehydrating, and grinding the beetle larvae to produce a dry powder; and a light treatment in which at least one light source emits ultraviolet radiation toward the dry powder to increase a concentration of vitamin D3.

2. The process according to claim 1, wherein transforming the beetle larvae further comprises slaughtering of said larvae.

3. The process according to claim 2, wherein the slaughtering comprises at least one selected from the group consisting of:

a cold treatment, a hot treatment, and a microwave treatment.

4. The process according to claim 3, wherein the slaughtering by heat treatment comprises placing the larvae in water having a temperature of between 50° C. and 120° C., preferably between 85 and 110° C.

5. The process according to claim 3, wherein the slaughtering by heat treatment is implemented for a slaughtering time of between 30 seconds and 10 minutes, preferably between 1 and 5 minutes.

6. The process according to claim 2, wherein transforming further comprises, prior to the slaughtering, a first sieving of said larvae in order to remove excrement.

7. The process according to claim 6, wherein the transforming further comprises, prior to the slaughtering, a fast for 24 to 48 hours.

8. The process according to claim 7, wherein the fasting is followed by a second sieving.

9. The process according to claim 2, wherein transforming further comprises, prior to the slaughtering, cold stunning at between −18° C. and +4° C.

10. The process according to claim 9, wherein the cold stunning is implemented for a stunning time of between 1 and 5 minutes.

11. The process according to claim 2, wherein the dehydrating is performed after slaughtering and is designed so that the slaughtered larvae contain between 2 and 15% water, more preferably between 3 and 8% water, and a water activity below 0.7.

12. The process according to claim 11, wherein the dehydrating comprises:

heating of said larvae during which the slaughtered larvae are placed in an environment at between 5° and 150° C. for a treatment time of between 1 hour and 24 hours; and/or a microwave treatment.

13. The process according to claim 2, wherein the beetle larvae are in the larval or nymphal phase.

14. The process according to claim 2, wherein the transforming is carried out on larvae fractions obtained from chemical or mechanical extraction techniques.

15. The process according to claim 2, wherein the transformed larvae have a thickness of between 1 and 100 millimeters, preferably between 5 and 15 millimeters, preferably after grinding.

16. The process according to claim 1, wherein the ultraviolet radiation emitted by said at least one light source toward the beetle larvae during the light treatment is:

UVB radiation and consists of electromagnetic radiation having a wavelength of between 280 nm and 320 nm; and/or UVA radiation and consists of electromagnetic radiation having a wavelength of between 320 nm and 400 nm.

17. The process according to claim 1, wherein, in the light treatment, the at least one light source is positioned at a specific distance from the beetle larvae between 1 and 100 centimeters, preferably between 5 and 20 centimeters.

18. The process according to claim 1, wherein said at least one light source has a radiation power of between 13 and 125 Watts, preferably between 20 and 50 Watts.

19. The process according to claim 2, wherein, during the light treatment, said at least one light source emits ultraviolet radiation toward the transformed beetle larvae in treatment ranges of between 10 minutes and 24 hours continuously or cumulatively over a period of 24 hours.

20. The process according to claim 2, wherein, during all or some of the light treatment, the transformed beetle larvae are kept in an environment having a substantially constant temperature of between 2° and 30° C., preferably between 26 and 28° C.

21. The process according to claim 2, wherein, during all or some of the light treatment, the transformed beetle larvae are kept in an environment having a substantially constant hygrometry of between 30 and 70% relative humidity, preferably between 30 and 40%.

22. The process according to claim 1, wherein the beetles are selected from the following species: *Tenebrio Molitor*, Alphitobius Diaperinus.

23. The process according to claim 1, further comprising, before the UV light treatment, a larvae pressing in order to extract an oily fraction of said larvae.

* * * * *